United States Patent [19]

Pinard

[11] 4,319,745
[45] Mar. 16, 1982

[54] ARRANGEMENT FOR DIVERTING DOCUMENTS IN A MACHINE INCORPORATING MEANS TO SORT THE DOCUMENT

[75] Inventor: Patrick Pinard, Seiches-le-Loir, France

[73] Assignee: Compagnie International pour l'Informatique Cii Honeywell Bull (Societe Anonyme), Paris, France

[21] Appl. No.: 102,403

[22] Filed: Dec. 11, 1979

[30] Foreign Application Priority Data

Dec. 28, 1978 [FR] France .................................. 78 36797

[51] Int. Cl.³ .......................................... B65H 29/58
[52] U.S. Cl. ................................................. 271/305
[58] Field of Search ............... 271/297, 303, 305, 312, 271/279; 209/657

[56] References Cited

U.S. PATENT DOCUMENTS 1,296,727 3/1919 Wright ............................. 271/303 X
1,825,217 9/1931 Tufts .................................... 271/303
3,189,342 6/1965 Bocock .............................. 271/303

FOREIGN PATENT DOCUMENTS 1103250 3/1961 Fed. Rep. of Germany .
1462974 12/1966 France .

OTHER PUBLICATIONS

IBM Technical Disclosure Bulletin, J. H. Meier, "Packet Selector", Jan. 1969, vol. 11, No. 8, pp. 993-994.

Primary Examiner—Richard A. Schacher
Attorney, Agent, or Firm—Edward J. Kondracki

[57] ABSTRACT

Improvement to a check sorter. The sorter comprises a sorting track and a number of diverters. Each diverter is pivotable about a vertical axis. Each diverter is caused to pivot by the magnetic effect created between a magnet attached to the diverter and a coil 21 arranged close to the magnet.

11 Claims, 4 Drawing Figures

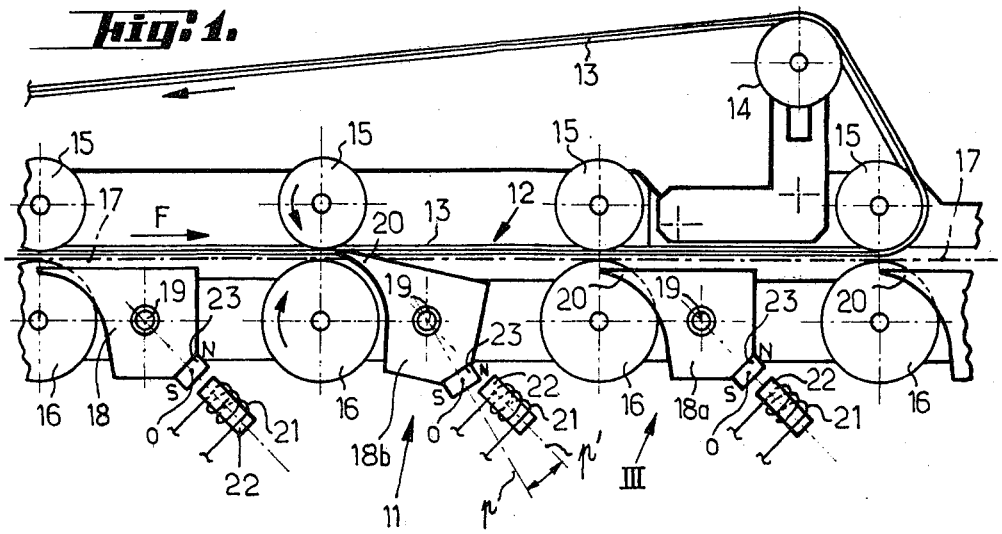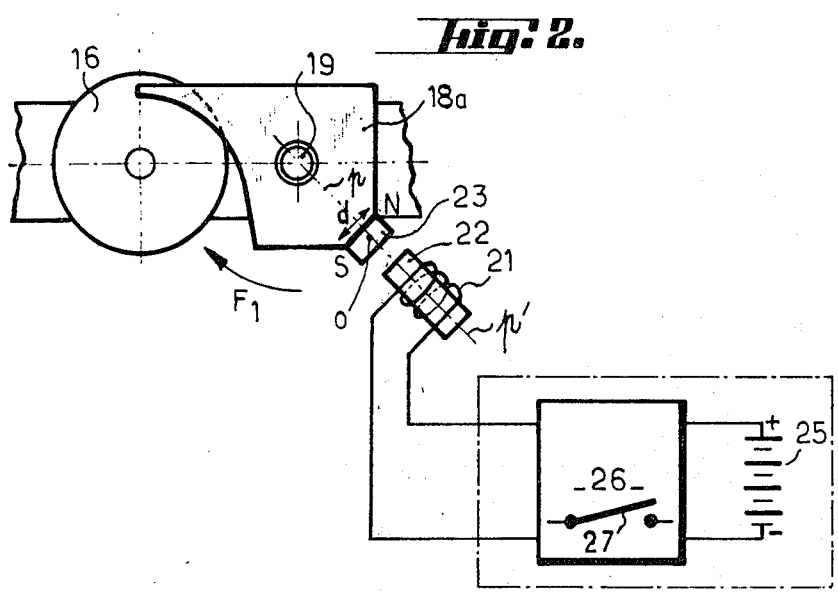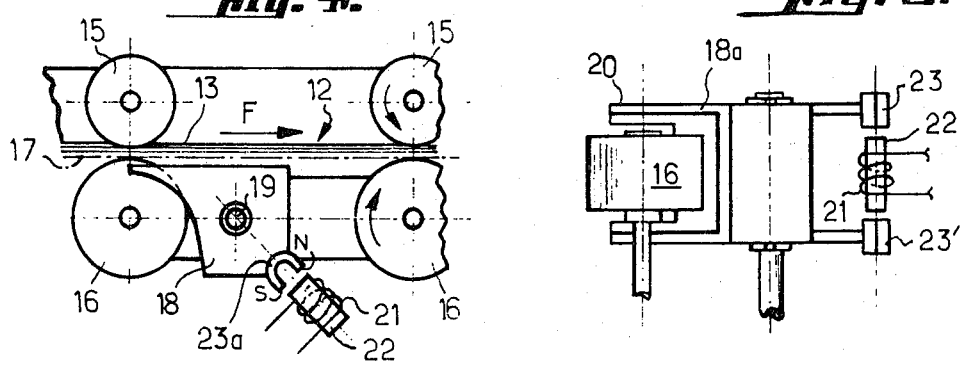

ARRANGEMENT FOR DIVERTING DOCUMENTS IN A MACHINE INCORPORATING MEANS TO SORT THE DOCUMENT

BACKGROUND OF THE INVENTION

1. Field of the Invention

The invention relates to the automatic sorting of documents and in particular to check sorters of the type now used in many banks. In particular, the invention relates to an improved diverting or switching arrangement fitted to a check sorter.

2. Description of the Prior Art

A machine for handling and sorting checks includes a magazine in which the checks are stacked and a number of processing stations (for automatic reading of data printed on the checks in CMC7 code, transfer of data carried on the check in manuscript or type-set form, etc. to a keyboard) which are separated from one another by guide tracks adapted to convey the checks, one by one, from one processing station to the next. The final processing station is connected to an automatic sorter which is caused to direct the check into a receiving hopper, as dictated by certain criteria (the details of the issuing bank for example). This sorter comprises a sorting track and a plurality of diverters which are positioned facing the track and which are mounted to pivot about an axis in such a way that each diverter is able to occupy two main angular positions. In the first angular position the diverter is adjacent the sorting track, but clear of the normal (undeflected) path of the check along the track. In the second angular position the diverter meets with or intersects the track in order to guide the check positively as it passes in front of the deflector in question and to divert it into a receiving hopper.

Hitherto, the diverters have been operated in a simple manner which has a number of drawbacks. For example, the diverter was provided with an extension which formed a lever and which was articulated by the moving rod of a plunger core type electromagnet. However, electromagnets of this kind consume a relatively large amount of electrical energy for a small output in mechanical terms. This results in a certain amount of undesirable heating in this part of the machine. In addition, the inertia of the plunger core is considerable and thus the overall response time of the diverter is fairly poor. Finally, the volume, weight and manufacturing cost of such an arrangement is relatively high.

Important technological progress has been made of late in the field of permanent magnets and there are now available on the market magnets, (ferrites or rare earths such as samarium for example) which have a high coercive field with low bulk and weight. The invention consists in exploiting the advantages of such magnets in causing movement of the diverter between the two positions defined above, by means of an arrangement which enables the familiar phenomenons of attraction and repulsion which occur between a permanent magnet of the type indicated above and another, non-permanent "magnet", i.e., an induction coil to be used.

SUMMARY OF THE INVENTION

The invention relates to an arrangement for diverting documents following a main path along a sorting track. The arrangement comprises a diverter or the like which is positioned opposite the sorting track and which is mounted to pivot about an axis in such a way as to be able to occupy at least two major angular positions. In the first angular position, the diverter is clear of the main path. In the second angular position the diverter meets with the main path so as to guide and deflect a document away from the main path. The invention is particularly characterized in that at least one permanent magnet is attached to the diverter and in that an induction coil which is connected to a source of DC voltage via a two-state control means is arranged near the magnet in a position which provides magnetic coupling between the said coil and the said magnet so that when the said control means is in one or the other of its states the diverter can be positioned in one or the other of the first and second angular positions respectively.

Normally, the induction coil will have a core of soft iron which enables the diverter to have one stable position (the said first angular position) in which no electrical energy is consumed. This position is obtained simply by self-positioning of the magnet opposite the core. However, a modified version may be conceived in which current flows in the coils at all times and the movement of the diverter is controlled by changing the direction of flow of current. In the latter case, the pivoting travel of the diverter can be doubled.

BRIEF DESCRIPTION OF THE DRAWINGS

The invention will be better understood and others of its objects, details and advantages will become more clear in the light of the following explanatory description which is given solely by way of example with reference to the accompanying non-limiting drawings, in which:

FIG. 1 is a fragmentary view from above of part of an automatic check processing machine or check sorter;

FIG. 2 is a detailed view to an enlarged scale of the improvement according to the invention;

FIG. 3 shows a modified version of the improvement of the invention, looking along arrow III of FIG. 1; and FIG. 4 shows yet another modified version of the improvement, the diverter being seen from above.

In FIG. 1 can be seen a general arrangement of a sorter 11 which forms part of a check handling machine. The sorter comprises a sorting track 12 represented by a drive belt 13 which is driven in rotation, in the direction indicated by arrow F, by a drive roller 14. The belt rests against a number of rollers 15 which are associated with counter-rollers 16 to define a straight main path 17 along which checks travel one by one (in a vertical plane adjacent the lateral wall of the belt on this path), provided they are not selected or diverted by one of the diverters 18.

Each of the diverters 18 is mounted to pivot about a vertical axis 19 to allow it to occupy two angular positions defined above. As shown in FIG. 1, diverter 18a is in a first angular position (clear of the main path 17), while diverter 18b is in a second angular position (that is to say with its point 20 intersecting the main path 17).

As can be seen from FIG. 3, the diverters 18 may be cut from a length of tube of rectangular cross-section with two edges of an opening in the tube length being cut-away to form a deflecting curve. One solid face of the length of tube is arranged substantially parallel to the guide track when the diverter is at rest. The diverter may be made of a low-density non-magnetic material such as a plastic material or an aluminum alloy. It is not in fact necessary for the whole of the front edge of the check as it moves along the sorting track to come into engagement with the diverter at the time when it is selected. Partial contact of the check with the diverter is adequate to turn the check aside, in conjunction with the adjacent counter roller 16. This being the case, each diverter 18 is extremely light and thus has minimal inertia which is hardly increased at all by the presence of a permanent magnet 23 which is attached (bonded for example) to the diverter 18 at one corner away from the curved deflecting surface and diametrically opposite point 29. An induction coil 21 which has a core 22 of a magnetic material exhibiting approximately zero retentivity, is arranged close to each magnet in a position which allows magnetic coupling between each coil and the respective magnet. The core 22 is for example made of soft iron and one of its ends is arranged in the immediate vicinity of the path followed by the corresponding magnet 23 as it pivots. As shown in FIGS. 1 to 3, the magnet 23 is the form of a straight bar and its axis of magnetization N-S is substantially perpendicular to a plane p passing through its center of symmetry o and containing the corresponding pivot axis 19. In the example illustrated, the coil 21 is connected to a source of DC voltage 25 via a two-state control means 26 formed by or incorporating a switch 27. Switch 27 is connected to close the electrical circuit between the voltage source 25 and the core 21, when the said control means is in one of its states.

Another important fact which should be mentioned is that, as can be seen in the drawings, the transverse dimension of the core 22 (its diameter if it is cylindrical) at least in the extreme portion close to the magnet, is of the same order of magnitude as the distance d separating the pole faces N-S of the magnet 23. If this is not the case, it will be fairly difficult to obtain an accurate and stable first angular position. The first angular position is in fact determined by the position automatically adopted by the magnet opposite the coil when the coil is not energized (when switch 27 of the control means 26 is opened). If the magnet were, for example, substantially longer than the transverse size of the core, the diverter would be able to assume a stable position such that either the north pole or the south pole of the magnet was as close as possible to the adjacent end of the core. There would thus be two stable positions corresponding to an unenergized induction coil. It is also clear that the air gap between the magnet and the core of the winding must be small so as to minimize the consumption of energy necessary to move the diverter.

Since this condition is met if the core 22 is straight, which is the case in the drawings, the core is preferably situated in the plane p' which contains the said corresponding pivot axis 19 and which passes through the said center of symmetry o, when the diverter is in the first above-mentioned angular position. In other words, in this first angular position planes p and p' coincide.

In the advantageous modified embodiment shown in FIG. 3, the core 22 is parallel to the pivot axis 19 and the coil can thus be accommodated underneath the magnet 23. This being the case, it is possible to position a second magnet 23' at the lower part of the diverter as viewed in the drawing, with an N-S orientation opposite from that of magnet 23, facing the other end of the core 22.

In the modification shown in FIG. 4, a magnet 23a is used whose pole faces N and S are in the same plane, that is to say a horseshoe magnet, the pole faces forming cross sections of the sides of the horseshoe. The general organization of the remainder of the arrangement is unaltered from that previously described, but it will be seen that the transverse size of the end of the core 22 which is situated facing the magnet is still of the same order of magnitude as the distance separating the two pole faces of the magnet.

The method of operation is extremely simple and will be clearly apparent from the above description. Given the orientation of the magnet shown in the drawing, the source of voltage 25 and the coil 21 are interconnected in such a way that a south pole is always created at the end of the coil which is closest to the magnet when current flows in the coil. The first angular position of the diverter being that in which no current flows in the coil, as soon as this south pole is created, it exerts a repulsive force on the south pole of the magnet and an attractive force on the north pole. The direction of movement, indicated by arrow F1 (FIG. 2), is thus clearly determined by the combination of these two forces and the diverter pivots to its second angular position. Under these conditions, a check traveling along the main path 17 and which is situated upstream of the diverter 18b when the latter pivots, is deflected into a receiving hopper, not shown.

As mentioned above, the two angular positions may be differently defined as dictated by the nature of the control means 26. If the latter is formed by or includes a polarity reverser rather than simply a switch which is connected between the voltage source and the coil, the latter will be supplied at all times with DC current of one or the other polarity, when the controls means is in one or the other state. In the arrangement shown in FIG. 2, the two angular positions of the diverter would correspond to two positions of the magnet 23 on either side of the axis of the coil 21, since one north pole and one south pole would be created alternately at the end of this coil depending upon the state of the control means formed by the reverser. The pivoting travel of the diverter must thus be doubled as compared with the travel which can be obtained with a coil which is supplied selectively with a current of only one polarity. It would of course be necessary to alter the position of the coil 21 from that which it occupies in FIG. 2 so that the first above-mentioned angular position for the diverter was still that occupied by diverter 18a in FIG. 1.

The invention is not of course in any way restricted to the embodiments which have just been described and it covers all technical equivalents of the means employed if these are within the scope of the following claims.

I claim:

1. In an arrangement for diverting documents which travel along a main path of a sorting track, the arrangement comprising a diverter positioned opposite the sorting track, said diverter being mounted to pivot about an axis to enable it to occupy at least two main angular positions, including a first angular position in which the said diverter is clear of the said main path, and a second angular position in which the diverter intersects with the main path so as to deflect and guide a document traveling along the main path away from the said main path, the improvement comprising at least one permanent magnet fixed to the diverter, an induction coil connected to a source of DC voltage via a two-state control means, said induction coil being arranged close to the said magnet in a position which provides magnetic coupling between the said coil and the said magnet, so as to position the said diverter in one or the other of the said first and said second angular positions respectively when the said control means is in one or the other of its states, said induction coil including a soft iron core of magnetizable material which exhibits virtually zero retentivity, said permanent magnet being in the form of a straight bar and arranged such that its magnetic axis is substantially perpendicular to a plane passing through its center of symmetry and containing the said pivot axis, the core of said coil being situated substantially in the plane which contains the said pivot axis and which passes through the said center of symmetry of said magnet when said diverter is in said first angular position, and said control means being formed by a switch adapted to close the electrical circuit between the said source and the said coil in one of its states.

2. An arrangement according to claim 1, wherein the transverse dimension of the said core is of the same order of magnitude as the distance separating the pole faces of the said magnet.

3. An arrangement according to claim 1, wherein said core is parallel to said pivot axis.

4. An arrangement according to claim 3, wherein said pivot axis is vertical, and said core is situated substantially under said magnet.

5. An arrangement according to claim 1, wherein said control means includes polarity reverse means connected between said source and said coil for causing the coil to be supplied with a DC voltage of one or other polarity when said control means is in one or other of its states.

6. In an arrangement for diverting documents which travel along a main path of a sorting track, the arrangement comprising a diverter positioned opposite the sorting track, said diverter being mounted to pivot about an axis to enable it to occupy either a first angular position in which the said diverter is clear of the said main path, or a second angular position in which the diverter intersects with the main path so as to deflect and guide a document traveling along the main path away from the said main path, the improvement comprising at least one permanent magnet fixed to the diverter and an induction coil connected to a source of DC voltage via a two-state control means, said induction coil including a core of magnetizeable material which exhibits virtually zero retentivity, said core being in the form of an elongated element having a longitudinal axis and ended by two opposite magnetic poles of which one is disposed in close proximity to said permanent magnet, said longitudinal axis of the core of said coil being situated substantially in a plane which contains the said pivot axis, said permanent magnet having faces spaced from one another by a distance substantially equal to the transverse dimension of the pole of the core which is in close proximity to said magnet, said magnet being disposed in said diverter such that its two pole faces are symmetrically disposed in relation to the axis of said core when said diverter is in its first position.

7. An arrangement according to claim 6, wherein said core is parallel to said pivot axis.

8. An arrangement according to claim 7, wherein said pivot axis is vertical, and said core is situated substantially under said magnet.

9. An arrangement according to claim 6, wherein said magnet is substantially U-shaped in profile and its pole faces are cross-sections of the ends of the limbs of the U.

10. An arrangement according to claim 6, wherein said control means includes polarity reverse means connected between said source and said coil for causing the coil to be supplied with a DC voltage of one or other polarity when said control means is in one or other of its states.

11. In an arrangement for diverting documents which travel along a main path of a sorting track, the arrangement comprising a diverter positioned opposite the sorting track, said diverter being mounted to a pivot about an axis to enable it to occupy at least two main angular positions, including a first angular position in which the said diverter is clear of the said main path, and a second angular position in which the diverter intersects with the main path so as to deflect and guide a document traveling along the main path away from the said main path, the improvement comprising at least one permanent magnet fixed to the diverter, an induction coil connected to a source of DC voltage via a two-state control means, said induction coil being arranged close to the said magnet in a position which provides magnetic coupling between the said coil and the said magnet, so as to position the said diverter in one or the other of the said first and said second angular positions respectively when the said control means is in one or the other of its states, said induction coil including a soft iron core of a magnetizable material which exhibits virtually zero retentivity, said permanent magnet being substantially U-shape in profile and its pole faces are cross-sections of the ends of the limbs of the U and arranged such that its magnetic axis is substantially perpendicular to a plane passing through its center of symmetry and containing the said pivot axis, the core of said coil being situated substantially in the plane which contains the said pivot axis and which passes through the said center of symmetry of said magnet when said diverter is in said first angular position, and said control means being formed by a switch adapted to close the electrical circuit between the said source and the said coil in one of its states.

* * * * *